(12) United States Patent
Takii et al.

(10) Patent No.: US 10,994,658 B2
(45) Date of Patent: May 4, 2021

(54) VEHICLE DISPLAY SYSTEM

(71) Applicant: KOITO MANUFACTURING CO., LTD., Tokyo (JP)

(72) Inventors: Naoki Takii, Shizuoka (JP); Yoshinori Shibata, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 23 days.

(21) Appl. No.: 16/214,809

(22) Filed: Dec. 10, 2018

(65) Prior Publication Data

US 2019/0202357 A1    Jul. 4, 2019

(30) Foreign Application Priority Data

Dec. 28, 2017  (JP) .............. JP2017-254186

(51) Int. Cl.
| | | |
|---|---|---|
| *H04N 7/18* | (2006.01) | |
| *B60R 1/00* | (2006.01) | |
| *B62D 6/00* | (2006.01) | |
| *G08G 1/16* | (2006.01) | |
| *G08G 1/0962* | (2006.01) | |
| *B60Q 9/00* | (2006.01) | |
| *B60R 13/10* | (2006.01) | |

(52) U.S. Cl.
CPC .............. *B60R 1/002* (2013.01); *B60Q 9/00* (2013.01); *B62D 6/002* (2013.01); *B62D 6/008* (2013.01); *G08G 1/0962* (2013.01); *G08G 1/167* (2013.01); *H04N 7/183* (2013.01); *B60R 13/10* (2013.01)

(58) Field of Classification Search
CPC ... C07C 201/08; C07C 205/43; C07C 213/02; C07C 229/66; C07C 68/02; C07C 69/96; C07D 215/233; C07D 215/56; G01N 33/5041; G01N 33/6872; B60Q 1/503; B60Q 9/00; B60R 13/10; B60R 1/002; Y02P 20/55
USPC .......................................... 348/149, 157, 119
See application file for complete search history.

(56) References Cited

U.S. PATENT DOCUMENTS

| | | | | |
|---|---|---|---|---|
| 10,579,070 | B1* | 3/2020 | Konrardy ............... | B60W 10/20 |
| 2012/0294238 | A1* | 11/2012 | Uhler ...................... | H04W 4/40 |
| | | | | 370/328 |
| 2013/0238441 | A1* | 9/2013 | Panelli ................... | G06Q 50/01 |
| | | | | 705/14.62 |
| 2014/0090280 | A1* | 4/2014 | Cunningham ...... | B60R 25/1001 |
| | | | | 40/201 |

(Continued)

FOREIGN PATENT DOCUMENTS

| | | |
|---|---|---|
| JP | 9-277887 A | 10/1997 |
| JP | 6015309 B2 | 10/2016 |
| WO | 2017073632 A1 | 5/2017 |

OTHER PUBLICATIONS

Communication dated Jun. 30, 2020 from the French Patent Office in application No. FR1874298.

*Primary Examiner* — Gims S Philippe
(74) *Attorney, Agent, or Firm* — Sughrue Mion, PLLC

(57) ABSTRACT

There is provided a vehicle display system to be used with a vehicle control unit which is configured to control a vehicle in an automated driving mode. The vehicle display system includes a display unit which is provided around or inside a license plate of the vehicle, and a display control unit which is configured to turn on the display unit while the vehicle control unit executes the automated driving mode.

13 Claims, 4 Drawing Sheets

(56) References Cited

U.S. PATENT DOCUMENTS

| | | | |
|---|---|---|---|
| 2015/0194082 A1* | 7/2015 | McEwan | G09F 21/048 |
| | | | 40/209 |
| 2017/0248441 A1* | 8/2017 | Heimrath | G01C 21/3691 |
| 2018/0058879 A1* | 3/2018 | Tayama | B60W 30/16 |
| 2018/0191510 A1* | 7/2018 | Batten | H04W 4/50 |
| 2018/0304804 A1 | 10/2018 | Tatara et al. | |
| 2018/0345790 A1* | 12/2018 | Mimura | B60W 50/16 |
| 2018/0345991 A1* | 12/2018 | Mimura | B60W 50/14 |
| 2019/0047586 A1* | 2/2019 | Sekine | B60W 50/082 |
| 2019/0359126 A1* | 11/2019 | Parkes | B60Q 1/503 |

\* cited by examiner

VEHICLE DISPLAY SYSTEM

CROSS-REFERENCE TO RELATED APPLICATIONS

The present application claims priority from Japanese Patent Application No. 2017-254186, filed Dec. 28, 2017, the entire content of which is incorporated herein by reference.

TECHNICAL FIELD

Aspects of the present invention relate to a vehicle lamp system.

BACKGROUND ART

Recently, researches on automated driving techniques of automobiles have been actively conducted in various countries, and each country considers legislation to allow a vehicle to travel on public roads in an automated driving mode. Here, the automated driving mode refers to a mode in which the traveling of the vehicle is automatically controlled. On the other hand, a manual driving mode refers to a mode in which the traveling of the vehicle is controlled by the driver. In an automated driving vehicle, the traveling of the vehicle is automatically controlled by a computer.

JP-A-H9-277887 discloses an automatic following traveling system where a following vehicle automatically follows a preceding vehicle. In the automatic following traveling system, each of the preceding vehicle and the following vehicle includes a display device, and character information for preventing another vehicle from interrupting between the preceding vehicle and the following vehicle is displayed on the display device of the preceding vehicle, and character information indicating that the vehicle is in the automatic following traveling is displayed on the display device of the following vehicle.

In the meantime, in JP-A-H9-277887, a system is not considered which displays information indicating that each vehicle is traveling in an automated driving mode to the outside.

SUMMARY

Accordingly, an aspect of the present invention provides a vehicle display system which can display information indicating that an own vehicle is traveling in an automated driving mode to the rear side of the own vehicle.

According to an embodiment of the present invention, there is provided a vehicle display system to be used with a vehicle control unit which is configured to control a vehicle in an automated driving mode, the vehicle display system including:

a display unit which is provided around or inside a license plate of the vehicle; and a display control unit which is configured to turn on the display unit while the vehicle control unit executes the automated driving mode.

According to the above configuration, there is provided the vehicle display system which can display information indicating that the own vehicle is traveling in the automated driving mode to a rear side of the own vehicle.

DETAILED DESCRIPTION

Figure 1:
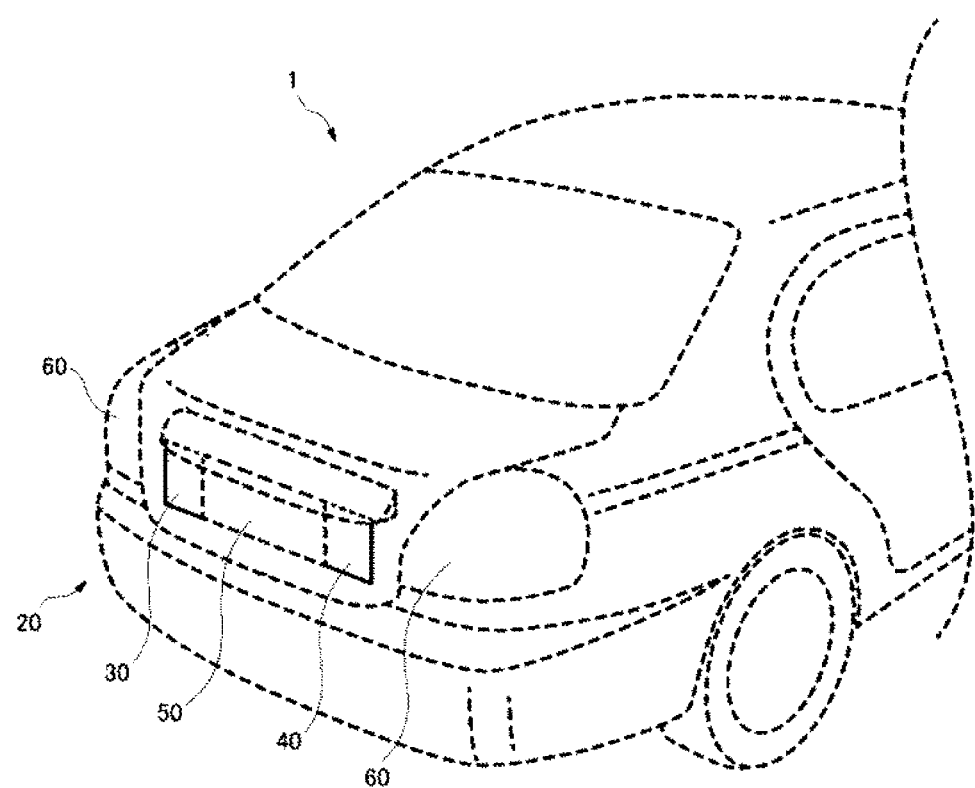
FIG. 1 is a view showing a vehicle mounted with a vehicle display system according to an embodiment of the present invention.

Hereinafter, an embodiment of the present invention (hereafter, referred to as "the embodiment") will be described with reference to the drawings. Incidentally, in the description of the embodiment, members having the same reference numerals as those already described are not described to simplify the description.

In the description of the embodiment, a "left-right direction", a "front-rear direction", and an "upper-lower direction" are appropriately referred to. These directions are relative directions set for a vehicle 1 shown in FIG. 1. The "upper-lower direction" is a direction including an "upper direction" and a "lower direction". The "front-rear direction" is a direction including a "front direction" and a "rear direction". The "left-right direction" is a direction including a "left direction" and a "right direction".

FIG. 1 shows the vehicle 1 mounted with a vehicle display system according to the embodiment. FIG. 1 is a perspective view as seen from an upper, right, rear side of the vehicle. The vehicle 1 is an automobile capable of traveling in an automated driving mode. As shown in FIG. 1, a license plate (also referred to as a vehicle registration plate or a number plate), a first display unit, and a second display unit are attached to a rear portion of the vehicle 1.

Figure 2:
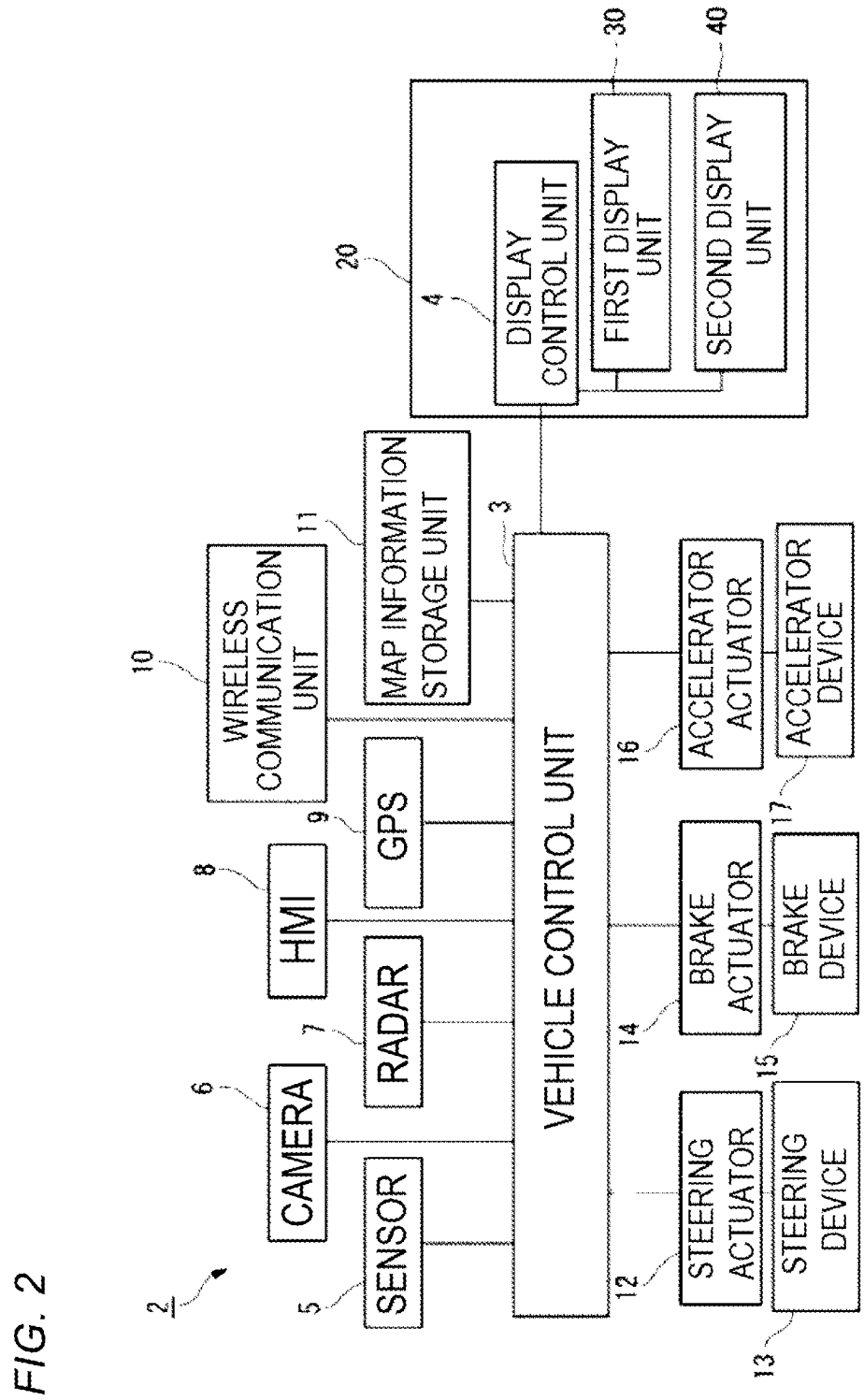
FIG. 2 is a block diagram of a vehicle system and the vehicle display system mounted on the vehicle.

FIG. 2 is a block diagram of a vehicle system 2 and a vehicle display system 20 mounted on the vehicle 1. First, the vehicle system 2 will be described with reference to FIG. 2. As shown in FIG. 2, the vehicle system 2 includes a vehicle control unit 3, a sensor 5, a camera 6, a radar 7, a Human Machine Interface (HMI) 8, a Global Positioning System (GPS) 9, a wireless communication unit 10, and a map information storage unit 11. Further, the vehicle system 2 includes a steering actuator 12, a steering device 13, a brake actuator 14, a brake device 15, an accelerator actuator 16, and an accelerator device 17.

The vehicle control unit 3 includes an Electronic Control Unit (ECU). The electronic control unit includes a processor such as a Central Processing Unit (CPU), a Read Only Memory (ROM) storing various vehicle control programs, and a Random Access Memory (RAM) temporarily storing various vehicle control data. The processor develops a program selected from various vehicle control programs stored in the ROM onto the RAM, and executes various processing in cooperation with the RAM. The vehicle control unit 3 controls the traveling of the vehicle 1 based on external information of the vehicle 1.

The sensor 5 includes an acceleration sensor, a speed sensor, a gyro sensor, or the like. The sensor 5 is configured to detect a traveling state of the vehicle 1 and output traveling state information to the vehicle control unit 3. The sensor 5 may further include a seating sensor which detects whether a driver is sitting on a driver seat, a face direction sensor which detects a direction of the face of the driver, an outside weather sensor which detects an outside weather condition, and a human sensor which detects whether there is a person in the vehicle. Further, the sensor 5 may include an illuminance sensor which detects the illuminance of the surrounding environment of the vehicle 1.

The camera 6 is, for example, a camera including an image sensor such as a Charge-Coupled Device (CCD) or a complementary MOS (CMOS). The camera 6 is a camera which detects visible light or an infrared camera which detects infrared rays. The radar 7 is a millimeter wave radar, a microwave radar, a laser radar, or the like. The camera 6 and the radar 7 are configured to detect the surrounding environment of the vehicle 1 (other vehicles, pedestrians, road shapes, traffic signs, obstacles, or the like) and output the surrounding environment information to the vehicle control unit 3.

The HMI 8 includes an input unit which receives an input operation from the driver, and an output unit which outputs driving information or the like to the driver. The input unit includes a steering wheel, an accelerator pedal, a brake pedal, a driving mode switch which switches the driving mode of the vehicle 1, or the like. The output unit is a display which displays various kinds of traveling information.

The GPS 9 is configured to acquire current position information of the vehicle 1 and output the acquired current position information to the vehicle control unit 3. The wireless communication unit 10 is configured to receive the travel information of another vehicle around the vehicle 1 from the other vehicle and transmit the travel information of the vehicle 1 to the other vehicle (vehicle-to-vehicle communication). The wireless communication unit 10 is configured to receive infrastructure information from infrastructure equipment such as a traffic light and an indicator light and transmit the traveling information of the vehicle 1 to the infrastructure equipment (road-to-vehicle communication). The map information storage unit 11 is an external storage device such as a hard disk drive storing map information and is configured to output the map information to the vehicle control unit 3.

The driving mode of the vehicle 1 includes a fully automated driving mode, an advanced driving support mode, a driving support mode, and a fully manual driving mode. When the vehicle 1 travels in the fully automated driving mode or the advanced driving support mode, the vehicle control unit 3 automatically generates a steering control signal, an accelerator control signal, and a brake control signal based on the external information such as the traveling state information, the surrounding environment information, the current position information, and the map information. The steering actuator 12 is configured to receive the steering control signal from the vehicle control device 3 and control the steering device 13 based on the received steering control signal. The brake actuator 14 is configured to receive the brake control signal from the vehicle control device 3 and control the brake device 15 based on the received brake control signal. The accelerator actuator 16 is configured to receive an accelerator control signal from the vehicle control device 3 and control the accelerator device 17 based on the received accelerator control signal. Accordingly, the traveling of the vehicle 1 is automatically controlled by the vehicle system 2 in these modes.

When the vehicle 1 travels in the driving support mode, the vehicle control unit 3 automatically generates at least one of the steering control signal, the accelerator control signal, and the brake control signal based on the external information such as the traveling state information, the surrounding environment information, the current position information, and the map information. When the vehicle 1 travels in the fully manual driving mode, the vehicle control unit 3 generates the steering control signal, the accelerator control signal, and the brake control signal in accordance with a manual operation of the driver to the accelerator pedal, the brake pedal and the steering wheel. Accordingly, in the driving support mode and the fully manual driving mode, at least one of the steering control signal, the accelerator control signal, and the brake control signal is automatically generated, and the rest is generated by the manual operation of the driver. The driver generally controls the traveling of the vehicle 1.

The driving mode of the vehicle 1 will be described. In the fully automated driving mode, the vehicle system 2 automatically performs all traveling controls among a steering control, a brake control, and an accelerator control, and the driver is not in a state of being capable of driving the vehicle 1. In the advanced driving support mode, the vehicle system 2 automatically performs all the traveling controls among the steering control, the brake control and the accelerator control, and the driver does not drive the vehicle 1 while being capable of driving the vehicle 1.

Meanwhile, in the driving support mode, the vehicle system 2 automatically performs some of the traveling control among the steering control, the brake control, and the accelerator control, and the driver drives the vehicle 1 under the driving support of the vehicle system 2. In the fully manual driving mode, the vehicle system 2 does not automatically perform the traveling control, and the driver drives the vehicle 1 without the driving support of the vehicle system 2.

In the following description, the automated driving mode refers to concept including the fully automated driving mode and the advanced driving support mode, and the manual driving mode refers to concept including the driving support mode and the complete manual driving mode.

The driving mode of the vehicle 1 may be switched by operating the driving mode switch. In this case, the vehicle control unit 3 switches the driving mode of the vehicle 1 among the four driving modes (the fully automated driving mode, the advanced driving support mode, the driving support mode, and the fully manual driving mode) in accordance with the operation of the driver to the driving mode switch. Further, the driving mode of the vehicle 1 may be automatically switched based on information about a traveling permitted section where the automated driving vehicle is permitted to travel and a traveling prohibited section where the traveling of the automated driving vehicle is prohibited or information about the external weather condition. In this case, the vehicle control unit 3 switches the driving mode of the vehicle 1 based on these kinds of external information. Further, the driving mode of the vehicle 1 may be automatically switched by using the seating sensor, the face direction sensor, or the like. In this case, the vehicle control unit 3 switches the driving mode of the vehicle 1 based on an output signal from the seating sensor or the face direction sensor.

Based on the external information obtained from the sensor 5, the camera 6, the GPS 9, the wireless communication unit 10, the map information storage unit 11, or the like, the vehicle control unit 3 determines, for example, the "automated driving level" of another nearby vehicle. The automated driving level in the embodiment is classified into two types: an "automated driving mode" level and a "manual driving mode" level. The "automated driving mode" level refers to concept including the fully automated driving mode and the advanced driving support mode. The "manual driving mode" level refers to concept including the driving support mode and the fully manual driving mode. The automated driving mode and the manual driving mode are distinguished by whether the driver has the right of driving the vehicle. In the fully automated driving mode and the advanced driving support mode, the driver does not have the responsibility of driving the vehicle, and the driver does not drive the vehicle. In the driving support mode and the fully manual driving mode, the driver having the responsibility of driving the vehicle drives the vehicle, and the vehicle control unit 3 supports driving by the driver.

As shown in FIG. 2, the vehicle display system 20 includes a display control unit 4, a first display unit 30, and a second display unit 40. Each of the first display unit 30 and the second display unit 40 has a light emitting function. The display control unit 4 is connected to the vehicle control unit 3. The display control unit 4 is connected to the first display unit 30 and the second display unit 40. The display control unit 4 controls lighting of the first display unit 30 and the second display unit 40.

Figure 3:
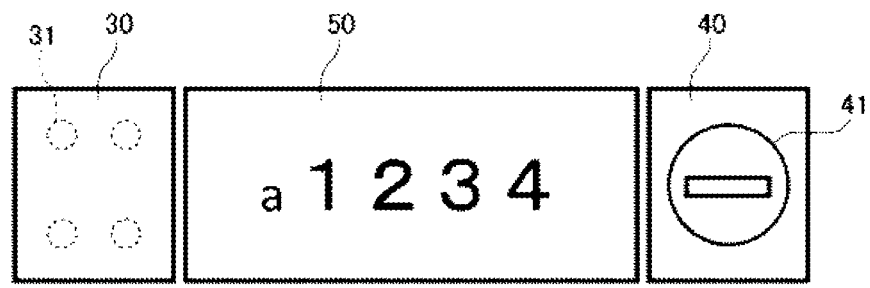
FIG. 3 is a view showing a first display unit, a second display unit, and a license plate of the vehicle display system as seen from the rear side of the vehicle.
Figure 4:
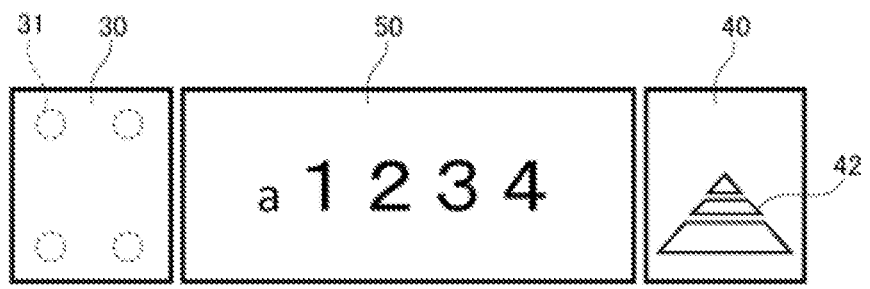
FIG. 4 is a view showing a display example of the second display unit different from that shown in FIG. 3.

The display units of the vehicle display system 20 will be described with reference to FIGS. 3 and 4. FIG. 3 is a view showing the first display unit 30 and a license plate 50 as seen from the rear side of the vehicle 1. FIG. 4 is a view showing a display example of the second display unit different from that shown in FIG. 3.

As shown in FIG. 3, the first display unit 30 is provided to the left of the license plate 50 as seen from the rear side of the vehicle 1. The first display unit 30 includes a substantially rectangular lens surface. The first light source 31 is disposed at a back side of the lens surface. The first light source 31 is provided at a position overlapping the first display unit 30 as seen from the rear side of the vehicle 1. The light emitted from the first light source 31 is emitted to the outside through the first display unit 30 of the lens surface. Accordingly, the first display unit 30 can make display as if it emit light. The first light source 31 can emit green light and white light. The display control unit 4 controls the display of the first display unit 30 by controlling the first light source 31.

The display control unit 4 turns on the first display unit 30 while the vehicle control unit 3 executes the automated driving mode where the steering control, the accelerator control, and the brake control are automatically performed. That is, the display control unit 4 is configured to turn on the first display unit 30 while the vehicle control unit 3 executes the fully automated driving mode or the advanced driving support mode. For example, the display control unit 4 turns on the first display unit 30 in green while the vehicle control unit 3 executes the fully automated driving mode. For example, the display control unit 4 turns on the first display unit 30 in white while the vehicle control unit 3 executes the advanced driving support mode. The vehicle control unit 3 turns off the first display unit 30 while the vehicle control unit 3 executes the driving support mode or the fully manual driving mode.

In the vehicle display system 20 according to the embodiment, the first display unit 30 (the display unit) is provided near the license plate 50 which is provided at a position easily visible from the rear side. Therefore, the first display unit 30 is also easily visible from the rear side. Since the first display unit 30 is provided at an easily visible position, it is easy to inform a vehicle or a pedestrian on the rear side of the own vehicle 1 that the own vehicle 1 is traveling in the automated driving mode.

Further, in the vehicle display system 20 according to the embodiment, the display control unit 4 turns on the first display unit 30 in green while the vehicle control unit 3 executes the fully automated driving mode, and turns on the first display unit 30 in white while the vehicle control unit 3 executes the advanced driving support mode. That is, the display control unit 4 turns on the first display unit 30 in different modes according to the level of the automated driving mode. Therefore, the level of the automated driving mode can be notified to the vehicle or the pedestrian around the vehicle 1. The display control unit 4 may be configured to turn on the first display unit 30 in a mode different from at least one of lighting color, a blinking period, a light emitting range, brightness, and a shape to illumination according to the level of the automated driving.

In the vehicle display system 20 according to the embodiment, the first display unit 30 is provided outside the license plate 50 on the left or right of the license plate 50 and below an upper end of the license plate 50 and above a lower end of the license plate 50 as seen from the rear side of the vehicle 1.

That is, the license plate 50 is provided at a position where the license plate 50 is easily visible from surrounding vehicles and pedestrians in the upper-lower direction. The area below the license plate 50 tends to be lower than a line of sight of a driver of a rear vehicle. Further, a trunk lid or the like is disposed in a region above the license plate 50, so that it is difficult to dispose the first display unit 30. Therefore, when the first display unit 30 is provided at the left or right of the license plate 50 at the same level as the license plate 50 in the upper-lower direction, the first display unit 30 is easily visible.

In the embodiment, upper and lower ends of the first display unit 30 and the second display unit 40 are equal to the upper and lower ends of the license plate 50 in the upper-lower direction. Accordingly, the rear portion of the vehicle 1 including the first display unit 30, the second display unit 40, and the license plate 50 provides a sense of unification in design.

A left end portion of the first display unit 30 disposed to the left of the license plate 50 is preferably positioned to the right of a position leftward away from a left end of the license plate 50 by the dimension of the license plate 50 in the left-right direction. By disposing the license plate 50 and the first display unit 30 close to each other, the visibility of the first display unit 30 is enhanced, and the design of the vehicle 1 is easily enhanced. Similarly, when the first display unit 30 is disposed on the right of the license plate 50, a right end portion of the first display unit 30 is preferably positioned to the left of a position rearward away from a right end portion of the license plate 50 by the dimension of the license plate 50 in the left-right direction.

As shown in FIG. 1, in the vehicle display system 20 of the embodiment, the first display unit 30 is provided between a right rear combination lamp 60R and a left rear combination lamp 60L and below an upper end of the right rear combination lamp 60R and an upper end of the left rear combination lamp 60L and above a lower end of the right rear combination lamp 60R and a lower end of the left rear combination lamp 60L, as seen from the rear side of the vehicle.

The first display unit 30 is easily visible from surrounding vehicles or pedestrians by being provided between the left and right rear combination lamps 60R, 60L in the left-right direction. The left and right rear combination lamps 60R and 60L are also provided at positions which are easily visible from surrounding vehicles and pedestrians in the upper-lower direction. Therefore, the first display unit 30 is also provided at the same height as the left and right rear combination lamps 60R and 60L, so that the first display unit 30 is easily visible from the surroundings.

In the vehicle display system 20 of the embodiment, the first light source 31 which causes the first display unit 30 to emit light is provided at a position overlapping the first display unit 30 as seen from the rear side of the vehicle 1. The design of the vehicle 1 as seen from the rear side can be simplified as compared with a case where the light source which causes the display unit to emit light is provided at a position not overlapping the display unit. Further, the first light sources tend not to become obstacles when another vehicle component is mounted on the vehicle 1.

In the embodiment, as shown in FIG. 3, the second display unit 40 is provided on the right of the license plate 50. The second display unit 40 is a substantially rectangular liquid crystal panel in which a plurality of liquid crystal elements are arranged. A surface light source is provided inside the second display unit 40. The display control unit 4 can change the display of the second display unit 40 by changing the liquid crystal elements in the second display unit 40.

The display control unit 4 changes the display of the second display unit 40 according to a signal from the vehicle control unit 3 while the vehicle control unit 3 executes the fully automated driving mode or the advanced driving support mode. In FIG. 3, the display control unit 4 controls the second display unit 40 to display a graphic 41 which prompts the rear vehicle 1 to stop. Alternatively, as shown in FIG. 4, the display control unit 4 controls the second display unit 40 to display a graphic 42 recommending the rear vehicle to travel following the own vehicle 1.

Accordingly, the vehicle display system 20 of the embodiment includes the first display unit 30 which is configured not to change the display mode unless the level of the automated driving mode changes, and the second display unit 40 which is configured to change the display mode even if the level of the automated driving mode does not change. Accordingly, while the level of the automated driving mode is displayed, the intention or the like of the own vehicle 1 can be displayed to the other vehicle while the automated driving mode is executed, at a position around the license plate 50 which is easily visible. Accordingly, it is easier to notify the vehicle, the pedestrian, or the like on the rear side of the own vehicle 1 that the own vehicle 1 performs the automated driving mode and the intention of the own vehicle 1.

Incidentally, the second display unit 40 is not limited to a liquid crystal device. For example, the second display unit 40 may be formed of a reflecting member, and a desired image may be projected from the second light source to the second display unit 40. The display control unit 4 may control the second light source to project an image corresponding to the intention of the own vehicle 1 on the second display unit 40.

First Modification

Figure 5:
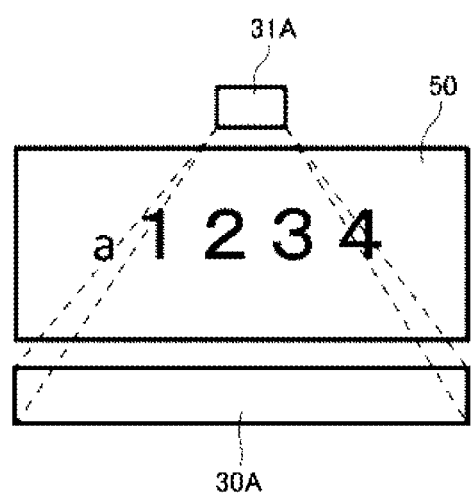
FIG. 5 is a view showing a first display unit and a license plate according to a first modification as seen from the rear side of the vehicle.

FIG. 5 is a view showing a first display unit 30A and the license plate 50 according to a first modification as seen from the rear side of the vehicle 1. As shown in FIG. 5, in the vehicle display system 20 of the first modification, the first display unit 30A is provided outside the license plate 50 below the license plate 50 and to the right from the left end portion of the license plate 50 and to the left from the right end portion of the license plate 50 as seen from the rear side of the vehicle 1.

It is preferable that a lower end portion of the first display unit 30A disposed below the license plate 50 be positioned above a position downward away from the lower end of the license plate 50 by the dimension of the license plate 50 in the upper-lower direction. By disposing the license plate 50 and the first display unit 30A close to each other, the visibility of the first display unit 30A is enhanced, and the design of the vehicle 1 is easily enhanced. Similarly, when the first display unit 30A is disposed above the license plate 50, it is preferable that an upper end portion of the first display unit 30A be positioned below a position upward away from an upper end portion of the license plate 50 by the dimension of the license plate 50 in the upper-lower direction.

In the first modification, the first display unit 30A is a reflecting plate which reflects light emitted from the first light source 31A provided above the license plate 50. The first light source 31A is provided at a position not overlapping the first display unit 30 as seen from the rear side of the vehicle 1. Since the degree of freedom of the layout of the first display unit 30A and the first light source 31 is enhanced, it is less likely to interfere with other members, and the design of the vehicle 1 is easily enhanced.

Unlike the first modification, the first display unit may be provided above the license plate 50. The first display unit may be provided so as to bend from below or above the license plate 50 to the left or the right.

Second Modification

Figure 6:
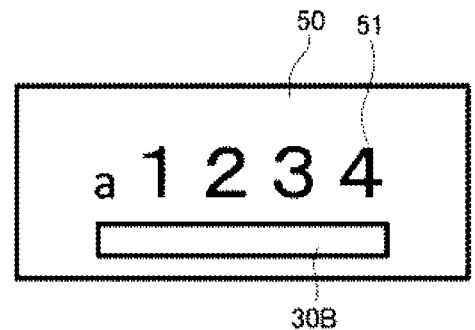
FIG. 6 is a view showing a first display unit and a license plate according to a second modification as seen from the rear side of the vehicle.

FIG. 6 is a view showing a first display unit 30B and the license plate 50 according to a second modification as seen from the rear side of the vehicle 1. As shown in FIG. 6, in the vehicle display system 20 of the second modification, the first display unit 30B is provided inside the license plate 50 and below a character string 51 of the license plate 50 as seen from the rear side of the vehicle 1. Since the first display unit 30B is provided inside the license plate 50, the position where the first display unit 30B is provided is more easily visible from the driver of the rear vehicle 1.

For example, a hole portion can be provided in the license plate 50 and the first display unit 30B can be disposed so as to be exposed outside the hole portion.

Incidentally, unlike the illustrated example, the first display unit may be provided inside the license plate 50 and above the character string 51 of the license plate 50.

Third Modification

Figure 7:
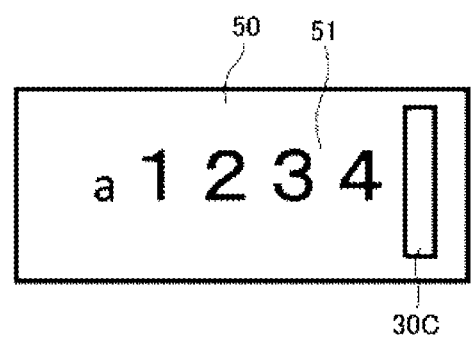
FIG. 7 is a view showing a first display unit and a license plate according to a third modification as seen from the rear side of the vehicle.

FIG. 7 is a view showing a first display unit 30C and the license plate 50 according to a third modification as seen from the rear side of the vehicle 1. As shown in FIG. 7, in the vehicle display system 20 of the third modification, the first display unit 30C is provided inside the license plate 50 and to the right of the character string 51 of the license plate 50 as seen from the rear side of the vehicle 1. The position where the first display unit 30C is provided is more easily visible from the driver of the rear vehicle 1. For example, a hole portion can be provided in the license plate 50 and the first display unit 30C can be disposed so as to be exposed outside the hole portion.

Incidentally, unlike the illustrated example, the first display unit may be provided inside the license plate 50 and to the left of the character string 51 of the license plate 50.

Fourth Modification

Figure 8:
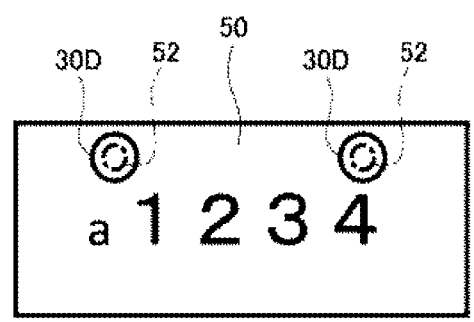
FIG. 8 is a view showing a first display unit and a license plate according to a fourth modification as seen from the rear side of the vehicle.

FIG. 8 is a view showing first display units 30D and the license plate 50 according to a fourth modification as seen from the rear side of the vehicle 1. The license plate 50 is attached to a vehicle body via fasteners 52 such as bolts. As shown in FIG. 8, in the vehicle display system 20 of the fourth modification, the first display units 30D are provided inside the license plate 50 at positions overlapping the fasteners 52 for attaching the license plate 50 to the vehicle body as seen from the rear side of the vehicle 1. By covering the fasteners 52 with the first display units 30D, the periphery of the license plate 50 can be configured in a simple design, and the design of the vehicle 1 can be enhanced.

In the above-described embodiment and first to third modification, the first display unit is described as a rectangular member, but the first display unit may be configured as a circular member as in the fourth modification. The first display unit may be formed into an ellipse, a polygon, a cylinder, a cone, a polygonal column, or a polygonal pyramid.

Fifth Modification

Figure 9:
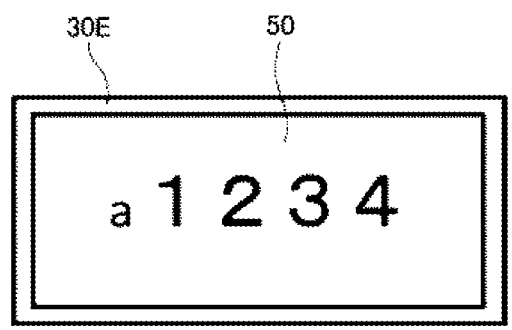
FIG. 9 is a view showing a first display unit and a license plate according to a fifth modification as seen from the rear side of the vehicle.

FIG. 9 is a view showing a first display unit 30E and the license plate 50 according to a fifth modification as seen from the rear side of the vehicle 1. As shown in FIG. 9, in the vehicle display system 20 of the fifth modification, the first display unit 30E is provided so as to border the license plate 50 as seen from the rear side ofthe vehicle 1. In other words, the first display unit 30E is provided on an edge of the license plate 50 to surround the license plate 50.

For example, by arranging a plurality of first light sources along the outer edge of the license plate 50, the first display unit 30E which borders the license plate 50 can be configured. Alternatively, by causing the light guide disposed along the outer periphery of the license plate 50 to emit light emitted from a single or a plurality of light sources, the first display unit 30E which borders the license plate 50 can be configured.

Although the embodiments of the invention have been described above, the technical scope of the invention should not be interpreted as being limited by the description of the embodiment. The present embodiment is merely an example, and it is appreciated by those skilled in the art that various embodiments can be changed within the scope of the invention described in the claims. The technical scope of the invention should be determined based on the scope of the invention described in the claims and the equivalent scope thereof.

As described above, the first display unit and the second display unit may include a lens, a liquid crystal element, a reflecting plate, a light source itself, a light guide, or the like.

In the above-described first to fifth modifications, the vehicle display system which does not include the second display unit is exemplified, but the second display unit may be added to the configurations of the first to fifth modifications. The second display unit is preferably arranged so as to be symmetrical with the first display unit with respect to a center of the license plate.

It is assumed in the above description that the vehicle display system 20 including the display control unit 4 is configured as an independent system separate from the vehicle system 2, but the present invention is not limited thereto. For example, the vehicle display system may be configured as a system including the vehicle control unit 3. Alternatively, the vehicle display system may be configured as a system including, for example, a camera, a sensor, a radar, or the like connected to the vehicle system 2. The display control unit 4 may be configured as a part of an ECU configuring the vehicle control unit 3. In this case, the display control unit 4 is mounted on the vehicle 1 instead of the lamp unit 100.

In the embodiment, the driving mode of the vehicle has been described as including the fully automated driving mode, the advanced driving support mode, the driving support mode, and the fully manual driving mode, but the driving mode of the vehicle should not be limited to these four modes.

Further, the categories and display forms of the driving modes of the vehicle may be appropriately changed according to laws or regulations relating to automated driving in each country. Similarly, the definitions of the "fully automated driving mode", the "advanced driving support mode", and the "driving support mode" described in the description of the embodiment are merely examples, and the definitions may be appropriately changed according to laws or regulations relating to automated driving in each country.

The invention claimed is:

1. A vehicle display system to be used with a vehicle control unit which is configured to control a vehicle in an automated driving mode, the vehicle display system comprising:
    a display unit which is provided around or inside a license plate of the vehicle; and
    a display control unit which is configured to turn on the display unit while the vehicle control unit executes the automated driving mode, wherein
    the display unit includes:
        a first display unit which is configured not to change a display mode unless level of the automated driving mode changes; and
        a second display unit which is configured to change a display mode even if the level of the automated driving mode does not change.

2. The vehicle display system according to claim 1, wherein the display control unit is configured to turn on the display unit in different modes according to a level of the automated driving mode.

3. The vehicle display system according to claim 1, wherein the display unit is provided outside the license plate on left or right of the license plate and below an upper end of the license plate and above a lower end of the license plate as seen from a rear side of the vehicle.

4. The vehicle display system according to claim 1, wherein the display unit is provided outside the license plate above or below the license plate and to a right from a left end portion of the license plate and to a left from a right end portion of the license plate as seen from a rear side of the vehicle.

5. The vehicle display system according to claim 1, wherein the display unit is provided inside the license plate and below or above a character string of the license plate as seen from a rear side of the vehicle.

6. The vehicle display system according to claim 1,
wherein the display unit is provided inside the license plate and to a right or to a left of a character string of the license plate as seen from a rear side the vehicle.

7. The vehicle display system according to claim 1,
wherein the display unit is provided inside the license plate at a position overlapping a fastener for attaching the license plate to a vehicle body as seen from a rear side of the vehicle.

8. The vehicle display system according to claim 1,
wherein the display unit is provided between a right rear combination lamp and a left rear combination lamp and below an upper end of the right rear combination lamp and an upper end of the left rear combination lamp and above a lower end of the right rear combination lamp and a lower end of the left rear combination lamp as seen from a rear side of the vehicle.

9. The vehicle display system according to claim 1,
wherein the display unit is provided so as to border the license plate as seen from a rear side of the vehicle.

10. The vehicle display system according to claim 1, further comprising:
a light source which is configured to cause the display unit to emit light,
wherein the light source is provided at a position overlapping the display unit as seen from a rear side of the vehicle.

11. The vehicle display system according to claim 1, further comprising:
a light source which is configured to cause the display unit to emit light,
wherein the light source is provided at a position not overlapping the display unit as seen from a rear side of the vehicle.

12. The vehicle display system according to claim 1,
wherein the display control unit is configured to turn on the display unit while the vehicle control unit executes the automated driving mode where a steering control, an accelerator control, and a brake control are automatically performed.

13. The vehicle display system according to claim 1,
wherein the display unit is configured to display information to the exterior of the vehicle indicating that the vehicle is traveling in an automated driving mode.

* * * * *